United States Patent
Fouces et al.

[11] 3,844,146
[45] Oct. 29, 1974

[54] WHEEL LOCK

[76] Inventors: Juan M. Fouces; Manuel Fouces, both of 2534 S.W. 9th No. 2, Miami, Fla. 33135

[22] Filed: May 24, 1973

[21] Appl. No.: 363,343

[52] U.S. Cl................................. 70/227, 70/233
[51] Int. Cl............................................. B62h 5/16
[58] Field of Search............ 70/226, 227, 233, 236; 211/5, 8

[56] References Cited
UNITED STATES PATENTS
458,832   9/1891   Hohoff................................. 70/226
FOREIGN PATENTS OR APPLICATIONS
600,584   12/1959   Italy..................................... 70/227
102,214   3/1899   Germany............................. 70/227

*Primary Examiner*—Albert G. Craig, Jr.
*Attorney, Agent, or Firm*—Torres & Berryhill

[57] ABSTRACT

Disclosed is a locking device which may be secured to the frame of a bicycle, motorcycle or other wheeled object for the purpose of selectively engaging and locking one of the wheels to prevent wheel rotation. The device includes closable jaws, a key or combination actuated lock mechanism and suitable mounting means for securing the device to the frame of the wheeled object.

6 Claims, 5 Drawing Figures

PATENTED OCT 29 1974　　　　　　　3,844,146
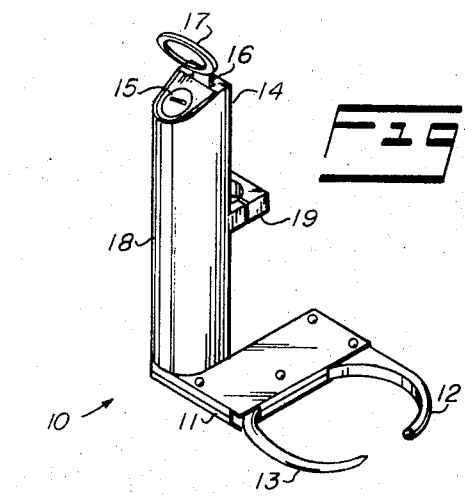
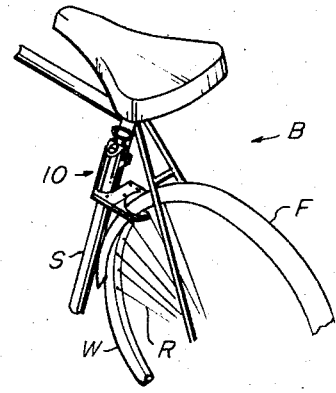
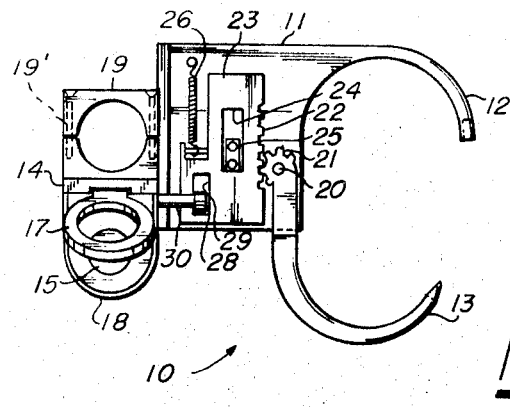
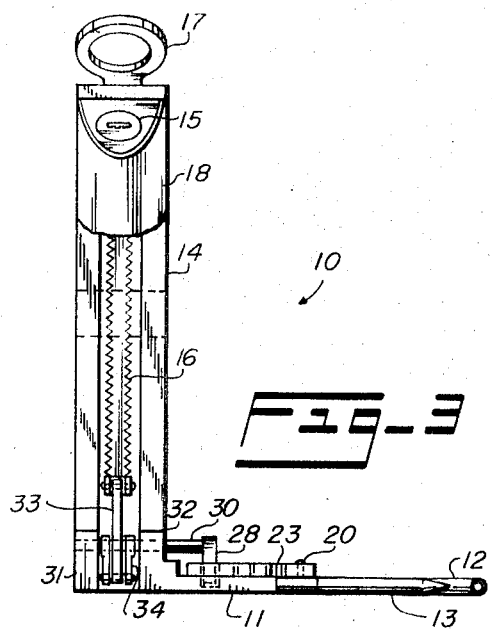
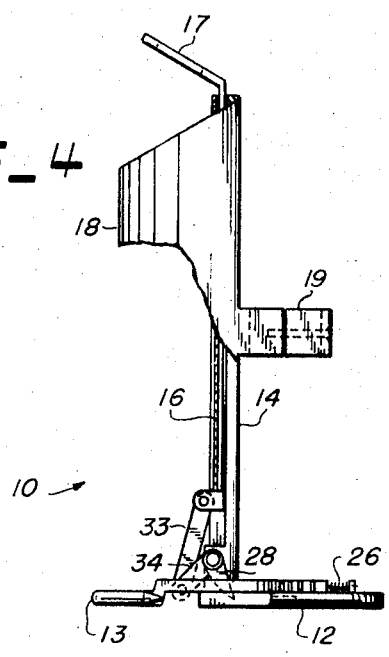

WHEEL LOCK

BACKGROUND OF THE INVENTION

1. Field of the Invention

The present invention relates to anti-theft devices. More specifically, the invention relates to a device employed to prevent the theft of bicycles or the like, by preventing rotation of the wheel.

2. Brief Description of the Prior Art

With the popularity of bicycle riding increasing, there has also been a corresponding increase in the number of bicycles stolen.

Many types of locking devices have been employed to prevent the theft of bicycles, the most common of which are specially designed padlocks which pass through the wheel spokes and lock around the rear frame members of the bicycle. Conventional padlocks with a length of chain have also been used in a similar fashion. A commonly employed improvement over the conventional padlock and chain is a locking mechanism permanently secured to one end of a chain or stranded cable. Many of these prior art anti-theft devices use combination-type locking mechanisms making it unnecessary to carry a key.

The problem with the above mentioned devices are that when they are not in use, they have to be carried in some manner since they are not directly attached to the bicycle. Moreover, many of the prior art devices are heavy, include long lengths of chain or cable and are, therefore, awkward and difficult to carry and store. It is also relatively easy to forget to take the locking device along when riding because the device is not permanently secured to the bicycle.

SUMMARY OF THE INVENTION

The present invention provides an easily installed anti-theft device for locking the rear wheel of a bicycle or other wheeled object. The lock includes a mounting and support member which, when employed on bicycles, is used to permanently secure the device to the vertical frame member forming the seat support for the bicycle. A base plate which forms a stationary jaw cooperates with a movable jaw pivotably mounted on the base plate to selectively encircle the wheel of the bicycle when the device is in the locked position.

The locking mechanism employs a ratchet type lock which is mechanically linked to the movable jaw and is normally biased to the open position by a spring.

The bicycle anti-theft device of the present invention is of simple mechanical design and construction and is therefore relatively inexpensive to manufacture. Thus, by the use of only a single movable jaw, unnecessary mechanical components have been eliminated. The device may be constructed from lightweight material, and is easy to install and simple to operate. With the device permanently secured to the bicycle, no unusual or time consuming manipulation is required to lock or unlock the bicycle wheel. Locking is simply effected by pulling upwardly on a ring attached to the locking mechanism. Release of the device is effected by simply inserting and turning the key which releases the spring bias and allows the movable jaw to open. Storage of the device is never a problem since it is permanently affixed to the frame.

Other features and advantages of the present invention will become more readily apparent from the following specification, the related drawings, and the claims.

BRIEF DESCRIPTION OF THE DRAWINGS

FIG. 1 is a partial perspective view illustrating a bicycle equipped with the anti-theft device of the present invention;

FIG. 2 is an enlarged perspective view of the present invention;

FIG. 3 is a front elevation, partially in section, illustrating details in the construction of the present invention;

FIG. 4 is a side elevation, partially in section, further illustrating the invention; and FIG. 5 is a plan view illustrating details in the construction of the rack and pinion mechanism employed to close the movable jaw of the present invention.

DESCRIPTION OF THE ILLUSTRATED EMBODIMENT

In the drawing, FIG. 1 illustrates a portion of a bicycle B, having a fender F, a wheel W, and a vertical seat support S. Attached to the support S of the bicycle B is the present invention, a bicycle anti-theft device indicated generally at 10. It will, of course, be understood that the anti-theft device 10 may be used for motorcycles and other small vehicles, both powered and manually operated.

It is desired that the anti-theft device 10 be permanently secured to the bicycle B and be constructed from a lightweight but strong material. When in the locked position, the device 10 encircles the fender F and the wheel W thereby preventing rotation of the wheel W.

As illustrated in FIG. 2, the bicycle anti-theft device 10 includes: a base plate 11, from which a stationary jaw 12 extends, and to which a movable jaw 13 is attached; and a vertical mounting plate 14 to which a locking mechanism 15 is attached. The mechanism 15 is equipped with a ratchet bar 16 having a ring 17 attached to the upper bar end for the purpose of locking the device 10. A housing 18 encloses the locking mechanism 15 to prevent tampering. The device 10 is suitably fastened to the bicycle B by a bracket 19 attached to the plate 14.

Referring now to FIGS. 3–5, the construction of the bicycle anti-theft device 10 is illustrated in greater detail. In FIG. 5, it will be noted that the stationary jaw 12 is an integral part of the base plate 11 and that the movable jaw 13 is pivotally attached at 20 to the plate 11. A pinion gear 21 is formed at the pivoting end 20 of the jaw 13 and engages a rack 22 which is formed along an edge of a slidable block 23. The block 23 is guided by an elongate notch 24 in the block 23 and a stationary guide block 25 fastened to the base 11. Normally, the block 23 is held in a position such that the jaw 14 is opened by a biasing spring 26 which is fastened to the base plate 11 and the block 23. A cam 28 engages a second notch 29 located in the block 23 and provides a means of moving the block 23 to close the jaw 13. The cam 28 is fastened to a shaft 30 by any suitable means. Brackets 31 and 32 provide support and allow the shaft 30 to rotate. A mechanical linkage consisting of arms 33 and 34 is attached to the ratchet bar 16 to convert the longitudinal movement of the bar 16 into a reciprocating movement of the cam 28, as can be seen in FIGS. 3 and 4.

In operation, the device 10 is rigidly secured to the seat supported S by bolting, welding or otherwise. When it is desired that the bicycle B be locked, the key is removed from the lock 15, the ring 17 is pulled upwardly making shaft 30 rotate and forcing the cam 28 to engage the block 23 which causes the rack 22 to move. This movement causes the pinion gear 21 to rotate thereby causing the movable jaw 13 to engage the stationary jaw 12 encircling the fender F and wheel W which engages the wheel spokes R and prevents rotation of the wheel W. To release the wheel W, the key must be inserted and turned to release the lock 15. The spring 26 will immediately pull open the jaw 13 back to its open position which allows the bicycle B to be moved.

One of the features of the present invention is that conventional means such as removable bolts 19' may be employed to secure the device 10 to the seat support S of the bicycle frame without reducing the effectiveness of the lock. Thus, even if the bolts 19' are removed, the locking engagement of the device 10 with the wheel W prevents the wheel from rotating within the supporting bicycle frame. This feature permits the lock to be removed from one bicycle and placed on another and also eliminates the need for special equipment such as welding tools to secure the lock to the bicycle frame.

It will be appreciated that the foregoing disclosure and description of the invention are illustrative and explanatory thereof, and various changes in the size, shape and materials as well as in the details of the illustrated construction may be made within the scope of the appended claims without departing from the spirit of the invention.

1. A locking device for a wheel supported body comprising:
   a. mounting means for securing said locking device to said body;
   b. engaging means included in said locking device for engaging at least one supportive wheel of said body to prevent said one wheel from freely rotating relative to said body, said one wheel including an annular rim section and radially extending support means;
   c. activating means included in said locking device for moving said engaging means into and out of engagement with said one wheel to respectively prevent or permit free rotation of said one wheel relative to said body, said engaging means further including jaw means for encircling said rim section to engage said radially extending support means upon partial rotation of said one wheel, said jaw means comprises a stationary member, relative to said body, and another member, pivotable relative to said stationary member; and
   d. releasable lock means included in said activating means for selectively retaining said engaging means in engagement with said one wheel and for permitting said engaging means to move out of engagement with said one wheel when said lock means is released.

2. A locking device as defined in claim 1 wherein said engaging means are normally biased to a position out of engagement with said one wheel.

3. A locking device as defined in claim 2 wherein:
   a. said body comprises a bicycle;
   b. said mounting means includes means for securing said device to the seat support of said bicycle; and
   c. said one wheel comprises the rear wheel of said bicycle.

4. A locking device as defined in claimm 1 wherein:
   a. said pivotable member is operatively connected with said activating means by a rack-and-pinion type mechanisms.

5. A locking device as defined in claim 4 wherein:
   a. said body comprises a bicycle;
   b. said mounting means includes means for securing said device to the seat support of said bicycle; and
   c. said one wheel comprises the rear wheel of said bicycle.

6. A locking device as defined in claim 1 wherein:
   a. said body comprises a bicycle;
   b. said mounting means includes means for securing said device to the seat support of said bicycle; and
   c. said one wheel comprises the rear wheel of said bicycle.

* * * * *

UNITED STATES PATENT OFFICE
CERTIFICATE OF CORRECTION

Patent No. 3,844,146            Dated October 29, 1974

Inventor(s) Juan M. Fouces and Manuel Fouces

It is certified that error appears in the above-identified patent and that said Letters Patent are hereby corrected as shown below:

Column 2, line 57, change "14" to -- 13 --.

Signed and sealed this 18th day of February 1975.

(SEAL)
Attest:

RUTH C. MASON
Attesting Officer

C. MARSHALL DANN
Commissioner of Patents
and Trademarks